(12) United States Patent
Brown et al.

(10) Patent No.: US 9,060,273 B2
(45) Date of Patent: Jun. 16, 2015

(54) AUTHENTICATION SERVER AND METHODS FOR GRANTING TOKENS COMPRISING LOCATION DATA

(75) Inventors: Andrew James Guy Brown, Waterloo (CA); Christopher M. Fogel, Kitchener (CA); Thomas Owen Parry, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 339 days.

(21) Appl. No.: 13/427,333

(22) Filed: Mar. 22, 2012

(65) Prior Publication Data

US 2013/0252583 A1 Sep. 26, 2013

(51) Int. Cl.
*H04M 1/66* (2006.01)
*H04M 1/68* (2006.01)
*H04M 3/16* (2006.01)
*H04W 12/06* (2009.01)
*H04L 29/06* (2006.01)
*H04W 12/08* (2009.01)
*H04W 4/02* (2009.01)

(52) U.S. Cl.
CPC ........... *H04W 12/06* (2013.01); *H04L 63/0807* (2013.01); *H04L 63/107* (2013.01); *H04W 12/08* (2013.01); *H04W 4/02* (2013.01)

(58) Field of Classification Search
CPC ............. H04M 2203/6081; H04M 2203/6072; H04M 2203/6009; H04M 2203/609
USPC ...................... 455/466, 410–411, 456.1–457; 370/328–338
See application file for complete search history.

(56) References Cited

U.S. PATENT DOCUMENTS

| 5,455,953 | A | 10/1995 | Russell |
| 6,304,969 | B1 | 10/2001 | Wasserman et al. |
| 6,643,701 | B1 | 11/2003 | Aziz et al. |
| 6,643,774 | B1 | 11/2003 | McGarvey |
| 6,678,733 | B1 | 1/2004 | Brown et al. |
| 7,461,400 | B2 | 12/2008 | Foster et al. |
| 7,698,566 | B1 | 4/2010 | Stone |
| 7,748,028 | B2 | 6/2010 | Sato et al. |

(Continued)

FOREIGN PATENT DOCUMENTS

| EP | 0924630 A1 | 6/1999 |
| EP | 1519604 A1 | 3/2005 |

(Continued)

OTHER PUBLICATIONS

European Response to the Extended European Search Report for European Patent Application No. 12160877.2, dated Aug. 28, 2013.

(Continued)

*Primary Examiner* — Quan M Hua
(74) *Attorney, Agent, or Firm* — Integral Intellectual Property Inc.; Miriam Paton; Amy Scouten

(57) ABSTRACT

An authentication server and methods of generating a token for use by a mobile device to establish authorization for the mobile device to access a service provided by a service server, the method comprising receiving a request for the token from the mobile device, generating the token comprising location data identifying a location for the mobile device and authentication data indicating a level of access that the mobile device is permitted to have to the service provided by the service server, and transmitting the token to the mobile device.

33 Claims, 6 Drawing Sheets

(56) References Cited

U.S. PATENT DOCUMENTS

| | | | |
|---|---|---|---|
| 7,813,511 B2 | 10/2010 | Leung et al. | |
| 7,836,493 B2 | 11/2010 | Xia et al. | |
| 7,853,995 B2 | 12/2010 | Chow et al. | |
| 7,877,794 B2 | 1/2011 | Fujiwara et al. | |
| 7,992,777 B1 | 8/2011 | Block et al. | |
| 8,010,783 B1 | 8/2011 | Cahill | |
| 8,898,453 B2 | 11/2014 | Preiss et al. | |
| 2002/0143922 A1 | 10/2002 | Tanimoto | |
| 2002/0160766 A1 | 10/2002 | Portman et al. | |
| 2003/0070091 A1 | 4/2003 | Loveland | |
| 2006/0053300 A1 | 3/2006 | Noguchi | |
| 2006/0224891 A1 | 10/2006 | Ilac et al. | |
| 2006/0239235 A1 | 10/2006 | Oswal et al. | |
| 2007/0015119 A1* | 1/2007 | Atenasio | 434/130 |
| 2007/0123215 A1* | 5/2007 | Wang et al. | 455/411 |
| 2007/0266246 A1 | 11/2007 | Lee et al. | |
| 2008/0104687 A1 | 5/2008 | Fujiwara et al. | |
| 2009/0094684 A1 | 4/2009 | Chinnusamy et al. | |
| 2009/0165095 A1 | 6/2009 | Ishikawa et al. | |
| 2009/0175215 A1* | 7/2009 | Chen et al. | 370/328 |
| 2009/0187986 A1 | 7/2009 | Ozeki | |
| 2010/0332832 A1 | 12/2010 | Wu et al. | |
| 2011/0271099 A1* | 11/2011 | Preiss et al. | 713/155 |

FOREIGN PATENT DOCUMENTS

| | | |
|---|---|---|
| EP | 1613017 A1 | 1/2006 |
| EP | 2384040 | 2/2011 |
| EP | 2642778 | 9/2013 |
| WO | 2008064589 A1 | 6/2008 |

OTHER PUBLICATIONS

United States Non-Final Office Action for U.S. Appl. No. 12/770,060, dated Jun. 20, 2013.

United States Request for Continued Examination and Response for U.S. Appl. No. 12/770,060, dated Apr. 12, 2013.

United States Advisory Action for U.S. Appl. No. 12/770,060, dated Apr. 9, 2013.

Extended European Search Report. European Application No. 12160877.2. Dated: Oct. 10, 2012.

Jaros, David et al., "New Location-based Authentication Techniques in the Access Management", Wireless and Mobile Communications, 2010 6th International Conference, Sep. 20, 2010, United States of America.

Bao, Lichun et al., "Location Authentication Methods for Wireless Network Access Control", Performance, Computing and Communications Conference 2008, Dec. 7, 2008, United States of America.

Office Action. Co-pending U.S. Appl. No. 12/770,060. Dated: Oct. 4, 2012.

Amendment. Co-pending U.S. Appl. No. 12/770,060. Dated: Dec. 19, 2012.

Final Office Action. Co-pending U.S. Appl. No. 12/770,060. Dated: Feb. 27, 2013.

Amendment after Final. Co-pending U.S. Appl. No. 12/770,060. Dated: Mar. 22, 2013.

Co-pending U.S. Appl. No. 12/770,060, Authentication Server and Method for Granting Tokens, filed Apr. 29, 2010.

Needham, Roger M. and Schroeder, Michael D., "Using Encryption for Authentication in Large Networks of Computers", Operating Systems, Communications of the Association for Computing Machinery, vol. 21, No. 12, Dec. 1978, p. 993-999.

United States Response for U.S. Appl. No. 12/770,060, dated Sep. 17, 2013.

Response. European Patent Application No. 12160877.2. Dated: Aug. 28, 2013.

Final Office Action. U.S. Appl. No. 12/770,060. Dated: Feb. 13, 2014.

Response after Final. U.S. Appl. No. 12/770,060. Dated: Apr. 8, 2014.

After Final Consideration Program Request. U.S. Appl. No. 12/770,060. Dated: Apr. 8, 2014.

Request for Continued Examination (RCE). U.S. Appl. No. 12/770,060. Dated: May 7, 2014.

Amendment. U.S. Appl. No. 12/770,060. Dated: May 7, 2014.

Advisory Action. U.S. Appl. No. 12/770,060. Dated: May 2, 2014.

Examiner-Initiated Interview Summary. U.S. Appl. No. 12/770,060. Dated: May 2, 2014.

Canadian Office Action for Canadian Patent Application No. 2,809,562, dated Dec. 19, 2014.

R. Droms et al., Authentication for DHCP Messages, Jun. 2001, Network Working Group, pp. 1-8.

Steffen Hallsteinsen, Using the mobile phone as a security token for unified authentication, Aug. 25-31, 2007, IEEE, pp. 1-6.

Vipin M. et al., A Multi Way Tree for Token Based Authentication, Dec. 12-14, 2008, IEEE, vol. 3, pp. 1-4.

Etsuko Suzuki, A Design of Authentication System for Distributed Education, May 31-Jun. 2, 2004, IEEE, pp. 66-71.

* cited by examiner

AUTHENTICATION SERVER AND METHODS FOR GRANTING TOKENS COMPRISING LOCATION DATA

TECHNICAL FIELD

Embodiments disclosed herein relate generally to an authentication server and methods for granting tokens to a mobile device for accessing a service on a service server.

BACKGROUND

To access some services offered by service providers, mobile devices are required to authenticate themselves to, for example, the service via a server (hereinafter "service server") before the service server will allow the mobile devices access to the services. There are different existing protocols and architectures for authentication of a mobile device. In some protocols and architectures, a client obtains a ticket from an authentication server and then uses that ticket to access a service provided by the service server.

Many mobile devices today are able to browse the Internet using web browsers. In some systems, mobile devices communicate with web servers directly. In other systems, mobile devices communicate with web servers through a browsing proxy.

BRIEF DESCRIPTION OF THE DRAWINGS

For a better understanding of the example embodiments described herein and to show more clearly how they may be carried into effect, reference will now be made, by way of example, to the accompanying drawings in which.

DETAILED DESCRIPTION

Figure 1:
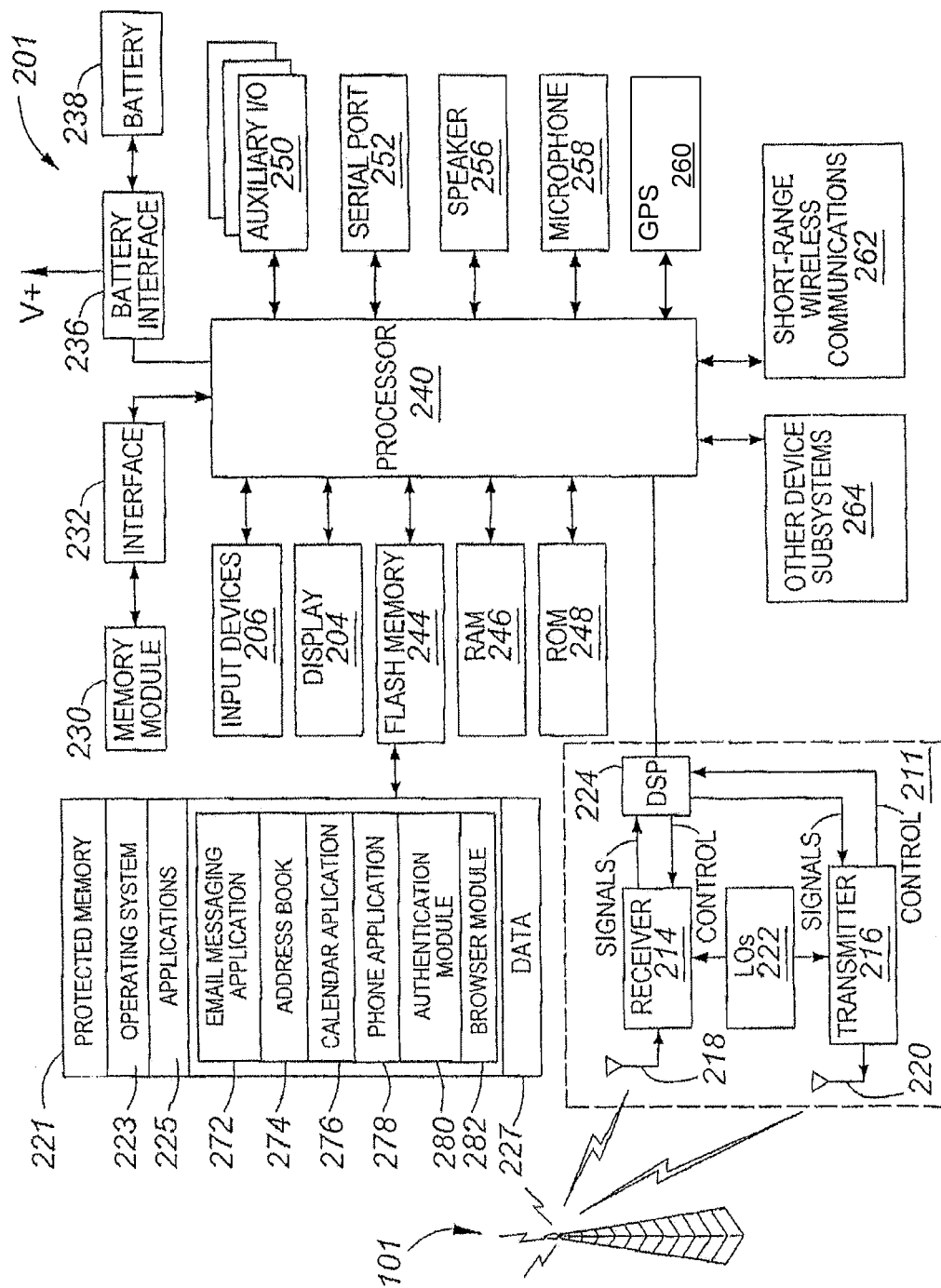
FIG. 1 is a block diagram of a mobile device in accordance with one example implementation.

Embodiments disclosed herein relate generally to an authentication server and method for granting tokens comprising location data to a mobile device for accessing a service on a service server.

Increasingly, mobile devices are able to access more and more sophisticated network services than mobile devices of previous generations. For example, many mobile devices are currently able to provide access to the Internet through web browsing software.

In some instances, it may be desirable for network service providers to control access by a mobile device to a particular network or web service. For example, it may be desirable for an Internet-facing server (e.g. an HTTP proxy) to be able to control access to resources (e.g. web pages, media items, etc.) based on a mobile device's service plan; some service plans may only allow access to certain web pages (e.g. the network service provider's own 'sports' portal, social media web pages, etc.) while denying access to other web pages (e.g. other hosts' sports' web pages, etc.). Other service plans may allow access to text and image data, but deny access to audio and video data. It may also be desirable to be able to allow or deny access to resources where a server providing these resources (e.g. an HTTP proxy) does not need to have direct knowledge of a mobile device's service plan.

In some instances, it may be desirable for network service providers to permit a mobile device access to a particular network service under certain conditions but not others. For example, it may be desirable for an Internet-facing server (e.g. an HTTP proxy) to be able to allow access to resources (e.g. web pages, media items, etc.) while billing the access at a certain fee tier, based on a mobile device's service plan; some service plans may only allow access to certain web pages (e.g. the network service provider's own 'sports' portal, social media web pages, etc.) and charge for such access on a first fee tier (e.g. free, a cost per service request, a cost per amount of data transferred, etc.), while allowing and charging for access to other web pages (e.g. other 'sports' web pages, etc.) based on a different fee tier. Other service plans may allow free access to text and image data, but charge a fee for access to audio and video data.

In certain network topologies for authorizing access to a network service (e.g. the Kerberos protocol or a variant thereof, etc.), a token-granting server (TGS) is responsible for Authentication, Authorization, and Accounting (AAA), either directly or by proxy (for example, a relay in front of the TGS might perform authentication and authorization). This token-granting server has knowledge of a device's service plan, and inserts a plan identifier or other authorization data into the token it issues to the device. This token may be at least partially encrypted to prevent unauthorized access to the service. The device sends this token to the service server (e.g. an HTTP proxy) with every request; the server decrypts the token, and inspects the service plan identifier. The service server can then apply rules or other logic when processing the request, and control access by the device as required based on the identifier. The use of tokens allows the service server to control access to the service without having to authenticate the identity of the mobile device requesting the service, allowing the service server to offload many of the tasks and resources associated with device authentication to the token-granting server.

In accordance with at least one embodiment described herein, location data is provided in the token by, for example, the token-granting server. It may be desirable to control access to a network service based on a location of the requesting device. For example, a company may want to restrict access to its intranet service server to devices located at or near company property. Also, a network operator may want to provide full access to a service when the device is in its 'home' region, but only provide limited access when the device is outside of its home region (e.g. when roaming). By incorporating location data into the token, a service server can authorize access to the service based on a location of the mobile device requesting the service while also deferring authentication functions to the TGS through the use of the token.

In some instances, the location data in the token may identify a registered location for the mobile device. For example, the location data may correspond to a billing address associated with the device. In such instances, the location data in the token may be independent of the physical location of the mobile device at the time the token was requested. This may allow the service server to compare the registered location of the mobile device with a determined physical location of the mobile device at the time the mobile device requests access the service.

In other instances, the location data in the token may identify a location of the mobile device at the time the token was requested by the mobile device. In some embodiments, the location of the mobile device may be determined by a Global Positioning System (GPS) or an assisted Global Positioning System (aGPS). Such a location may be a relatively fine-grained location (e.g. within a few meters, or a few city blocks) and may represent the vicinity of a home address, or the vicinity of a work address. Alternatively, such a location may be a relatively coarse-grained location (e.g. identifying a city/metro area, a country, or a group of countries (e.g. Europe)). In such instances, the service server may be able to compare the location of the mobile device at the time the token was requested with a determined physical location of the mobile device at the time the mobile device requests access to the service. This may allow additional or more nuanced rules or other logic (e.g. regarding access, fee tiers, etc.) to be applied to the request.

Typically, expiration data is associated with authorization tokens issued in token-based authentication schemes. For example, a time-restricted token may only be valid within 48 hours of being issued. A device may be expected to acquire a new token in order to continue to access the service after the 48 hours period. In these situations, there may be a trade-off between security (e.g. by providing relatively short-lived tokens) and network efficiency (e.g. additional network resources needed to generate and transmit a greater number of tokens). As another example, a time-restricted token may only be valid until a particular date or time or both (e.g., Mar. 14, 2012 at 1:59 EST). In variant embodiments, the duration of a token's validity may be dependent on a location of the mobile device. For example, a token may expire after determining that a location of the mobile device has changed.

Providing a token comprising location data may present an alternative to the use of time-restricted tokens, or may allow time-restricted tokens to be provided with additional or enhanced functionality. For example, in a prior authentication scheme, if a company wanted to restrict access to its intranet service server to devices located at or near company property, the company may consider issuing very short-lived tokens, so that if an employee's device was issued a new token at or near the end of a work day, the token would not still be valid by the time employee returned home. By providing a token comprising location data, a company may be able to issue tokens less frequently, and with longer expiry times, as authorization to access the intranet service server can be based at least in part on a location of the mobile device requesting the service.

In a broad aspect, there is provided a method of generating a token for use by a mobile device to establish authorization for the mobile device to access a service provided by a service server, comprising: receiving, at an authentication server, a request for the token from the mobile device, generating the token at the authentication server, the token comprising location data identifying a location for the mobile device and authentication data indicating a level of access that the mobile device is permitted to have to the service provided by the service server, and transmitting the token to the mobile device.

In another broad aspect, the request received from the mobile device comprises data on which the location data of the token is based. In some embodiments, the method further comprises receiving, at the authentication server, data, from at least one of a location services server and a network provider, on which the location data of the token is based.

In another broad aspect, the location data identifies a geographical location of the mobile device. The location data may identify the geographical location in which the mobile device operates at a time the request is transmitted from the mobile device to the authentication server.

In another broad aspect, the method further comprises receiving, at the authentication server, policy data from a policy server, and the authentication data of the token is generated based on the policy data.

In another broad aspect, the authentication data of the token indicates that the service server is to control access by the mobile device to the service based on the location data of the token.

In another broad aspect, at least one of the location data and the authentication data of the token is encrypted using a secret shared between the authentication server and the service server.

In another broad aspect, the request for the token from the mobile device is received by the authentication server via a relay, and the token is generated in response to the relay successfully authenticating the mobile device.

In another broad aspect, the request comprises a device identifier, and the method further comprises, prior to generating the token, verifying that the device identifier corresponds to a source address of a message containing the request for the token.

In another broad aspect, the authentication data indicates that the mobile device is authorized to access a browsing proxy server.

In another broad aspect, there is provided an authentication server comprising: a receiver capable of receiving a request for a token from a mobile device, the token for use by the mobile device to establish authorization for the mobile device to access a service provided by a service server; a transmitter capable of transmitting the token to the mobile device; a memory; and a processor capable of generating the token, the token comprising location data identifying a location for the mobile device and authentication data indicating a level of access that the mobile device is permitted to have to the service provided by the service server, and causing the token to be transmitted to the mobile device.

In another broad aspect, the request received from the mobile device comprises data on which the location data of the token is based. In some embodiments, the processor is capable of receiving data, from at least one of a location services server and a network provider, on which the location data of the token is based.

In another broad aspect, the location data identifies a geographical location of the mobile device. The location data may identify the geographical location in which the mobile device operates at a time the request is transmitted from the mobile device to the authentication server.

In another broad aspect, the processor is capable of receiving policy data from a policy server, and authentication data of the token is generated based on the policy data.

In another broad aspect, the authentication data of the token indicates that the service server is to control access by the mobile device to the service based on the location data of the token.

In another broad aspect, the processor is capable of encrypting at least one of the location data and the authentication data of the token using a secret shared between the authentication server and the service server.

In another broad aspect, the receiver receives the request for the token via a relay, and the processor is capable of generating the token in response to the relay successfully authenticating the mobile device.

In another broad aspect, the request comprises a device identifier, and the processor is capable of verifying, prior to generating the token, that the device identifier corresponds to a source address of a message containing the request for the token.

In another broad aspect, the authentication data indicates that the mobile device is authorized to access a browsing proxy server.

In another broad aspect, there is provided a mobile device comprising: a processor and a memory, the processor being capable of transmitting a request to an authentication server for a token, the token for use by the mobile device to establish authorization for the mobile device to access a service provided by a service server, and the processor being capable of receiving the token from the authentication server, the token comprising location data identifying a location for the mobile device and authentication data indicating a level of access that the mobile device is permitted to have to the service provided by the service server.

In another broad aspect, the processor is capable of transmitting a request to the service server to access the service, the request comprising the token received from the authentication server, and the token is usable by the service server to authorize the mobile device to access the service.

In another broad aspect, there is provided a computer-readable medium having computer-readable instructions stored thereon that, when executed by a processor on a mobile device, cause the mobile device to obtain a token for establishing authorization to access a service provided from a service server by transmitting a request to an authentication server for a token, the token for use by the mobile device to establish authorization for the mobile device to access a service provided by a service server; and receiving the token from the authentication server, the token comprising location data identifying a location for the mobile device and authentication data indicating a level of access that the mobile device is permitted to have to the service provided by the service server. The computer-readable medium may include non-transitory computer-readable storage media.

In another broad aspect, there is provided a method of authorizing a mobile device to access a service provided by a service server, the method comprising: receiving, at the service server, a request from the mobile device to access the service, wherein the request comprises a token generated by an authentication server, the token comprising location data identifying a location for the mobile device and authentication data indicating a level of access that the mobile device is permitted to have to the service provided by the service server; determining, at the service server, whether the mobile device is authorized to access the service based on both the authentication data and the location data in the token generated by the authentication server; and allowing or denying the mobile device access to the service based on the determining.

In another broad aspect, the authentication data of the token indicates that the service server is to control access by the mobile device to the service based on the location data of the token. In another broad aspect, determining whether the mobile device is authorized to access the service may comprise comparing the location data in the token to policy data associated with the service; if the policy data indicates that access to the service is authorized based on the location data, the mobile device is authorized to access the service, and if the policy data indicates that access to the service is denied based on the location data, the mobile device is denied access to the service.

These and other aspects and features of various embodiments will be described in greater detail below. Embodiments of the present application are not limited to any particular mobile device architecture or server architecture; it is to be understood that alternate embodiments are feasible. For example, different embodiments may, in variant implementations, be associated with different operating systems or computer programming languages.

Reference is now made to FIG. 1, which illustrates an example embodiment of a mobile device 201. The mobile device 201 in the example comprises a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communications, a smartphone, a mobile telephone or a PDA (personal digital assistant) enabled for wireless communication, a tablet computing device, or a computer system with a wireless modem, for example. In other embodiments, the device 201 may be a multiple-mode communication device configured for data communications but not voice communications, or for voice communications but not data communications.

The mobile device 201 may comprise a rigid case (not shown) housing the components of the device 201. The internal components of the device 201 are typically constructed on a printed circuit board (PCB). The mobile device 201 may comprise a controller comprising at least one processor 240 (such as a microprocessor) which controls the overall operation of the device 201. The processor 240 interacts with device subsystems, which may include, for example, a wireless communication subsystem 211 (sometimes referred to as a radio layer) for exchanging radio frequency signals with the wireless network 101 to perform communication functions. The processor 240 may interact with additional device subsystems including, for example, a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, one or more data ports 252 such as a serial data port and/or a Universal Serial Bus (USB) data port, one or more speakers 256, one or more microphones 258, a short-range communication subsystem 262, and potentially other device subsystems generally designated as 264. Some of the subsystems shown in FIG. 1 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which may overlay the display screen 204. The touch-sensitive overlay and the electronic controller provide a touch-sensitive input device and the processor 240 typically interacts with the touch-sensitive overlay via the electronic controller.

The communication subsystem 211 may include a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communications, the particular design of the wireless communication subsystem 211 typically depends on the wireless network 101 in which mobile device 201 is intended to operate.

The mobile device 201 may communicate with any one of a plurality of fixed transceiver base stations (not shown) of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 1, the software modules 221 may comprise, for example, operating system software 223, software applications 225 comprising an email messaging application 272 (also referred to as an email client 272), a personal address book 274, a calendar application 276, a phone application 278, an authentication module 280 and a browsing module 282. Example embodiments of the authentication module 280 will be discussed in detail later herein. It is recognized that the authentication module 280 and its various components as described herein can form a discrete module running on the device 201, or the functions of the authentication module 280 can be distributed on the device 201 as separate modules or integrated within other existing modules as desired. Such discrete or distributed implementations all fall within the embodiments of the authentication module 280 as described herein.

In some embodiments, the authentication module 280 is configured to obtain tokens from an authentication server for accessing a browsing proxy. In other implementations, the token is for accessing a server containing data files. In still other implementations, the token is for accessing a service, such as banking services. Once obtained, a token can be used by the browsing module 282 to access the browsing proxy directly and enable the user of the mobile device 201 to access the Internet.

The software applications 225 also may include a range of applications, including, for example, a notepad application, Internet browser application, voice communication (i.e. telephony) application, map application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to different types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem 260 comprising a GPS receiver or transceiver for communicating with a GPS satellite network. The auxiliary I/O subsystems 250 may comprise a pointing or navigational input device such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in a persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 may also include a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201. Mobile device 201 may also be solar-powered.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

One or more applications that control basic device operations, including data and voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation may increase the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and a voice communication mode. In some embodiments, a data communication mode may be provided while a voice communication mode is not provided. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using input devices of the mobile device 201 in conjunction with the display screen 204. These composed items may be transmitted through the communication subsystem 211 over the wireless network 101.

In the voice communication mode, where provided, the mobile device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

The phone application 278 can be implemented using multiple applications or sub-modules, for example one or more user phone modules and a call control module. The user phone modules may provide a variety of telephony features through a user interface, while the call control module may provide access to common telephony functions desired by the user phone modules, such that telephony requests from phone modules can be coordinated and so that the user phone modules do not need to each provide instructions that can be directly understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

With respect to at least some of the embodiments described herein, an authentication system and method is provided for authenticating a mobile device attempting to access a service, such as, a browsing proxy in order to browse the internet. The approach may use a Kerberos-like authentication protocol, wherein the authentication and authorization function is kept separate from the token granting function.

Figure 2:
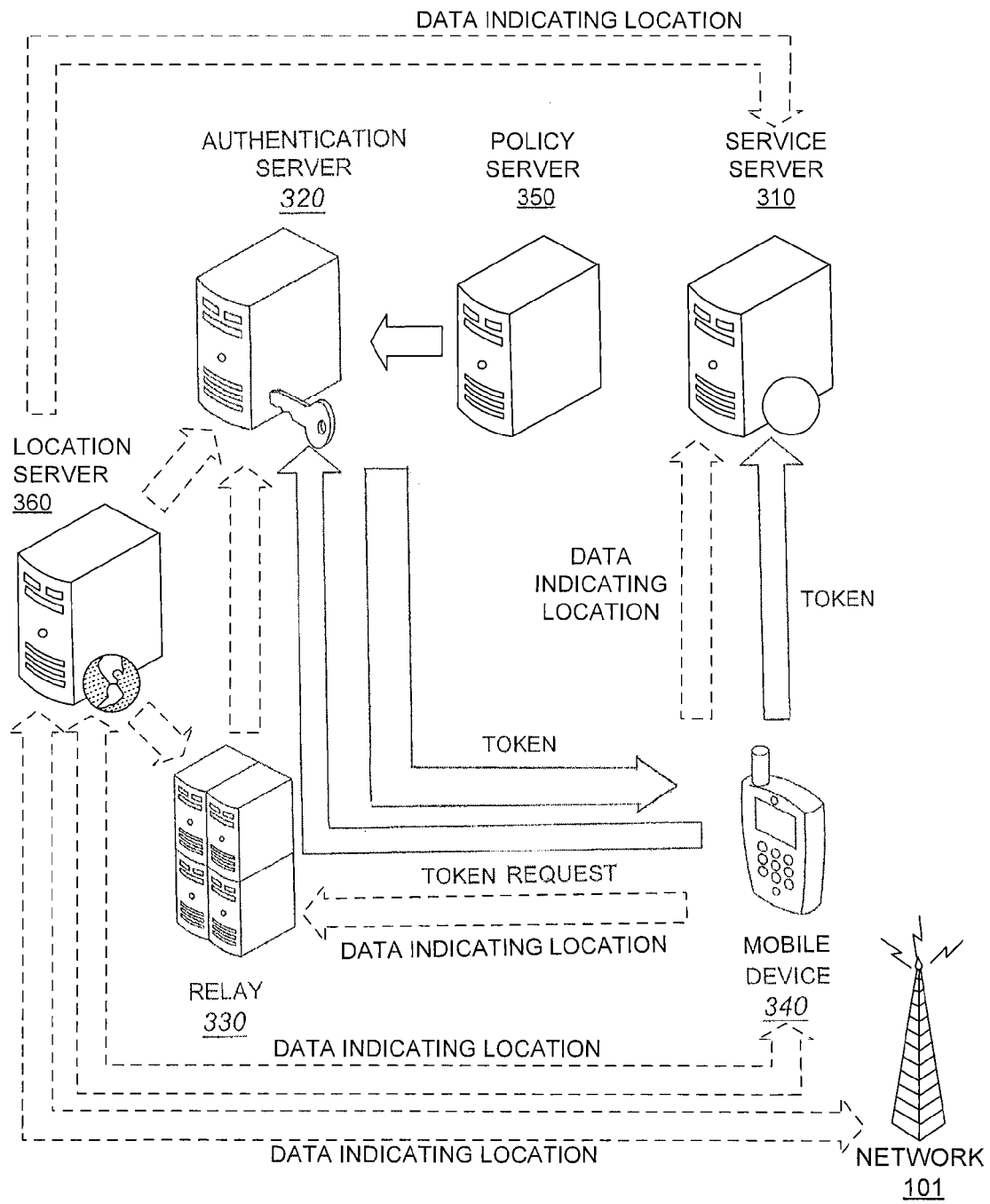
FIG. 2 is a diagram of a system in accordance with one example implementation.

Referring now to FIG. 2, to support authorization and authentication for the service on a service server 310, an authentication server 320 is provided in accordance with at least one embodiment, which may be in communication with a relay 330. Mobile devices 340 (only one shown in FIG. 2 for ease of illustration) are granted access to the service on the service server 310 by means of an authentication and authorization mechanism, which may be relay-based. It is to be understood that mobile devices 340 referred to with reference to FIG. 2 may include but are not limited to mobile device 201 described above with reference to FIG. 1. An example authentication mechanism is a user identification and password mechanism, wherein the mobile device 340 provides the authentication server 320 with a user identifier and password unique to the mobile device 340 or a device PIN in order to access the authentication server 320. In some embodiments, the mobile device 340 registers and thus authenticates itself with the authentication server 320 prior to outputting the request for the token to the authentication server 320.

In some embodiments, the mobile device 340 provides the relay 330 with a user identifier and password unique to the mobile device 340 or a device PIN in order to access the relay 330. In some embodiments, the mobile device 340 registers and thus authenticates itself with the relay 330 prior to outputting the request for the token to the relay 330.

In embodiments where mobile device 340 communicates with the authentication server 320 through relay 330, because all communications between the mobile device and the authentication server pass through relay 330 that ensures the mobile device is authorized to access the service (and in some cases authenticates the mobile device and in some further embodiments has cryptographic capabilities), the authentication server may not be required to authenticate the mobile device or to receive any identifying information about the device; the authentication server relies on the relay to perform those functions. In essence, if the request for a token is successfully validated by the relay, then the authentication server trusts that the request is valid, and grants (i.e. generates and transmits) the token. The authentication server thus can act solely as a token granting-device in some embodiments.

An example authorization mechanism is one in which the relay determines the services that a device may use on the basis of information in a service provisioning database in the relay, or on the basis of information provided by a policy server 350. In an alternative example embodiment, the authentication server 320 determines the services that a device may use on the basis of information in a service provisioning database in the authentication server 320, or on the basis of information provided by the policy server 350.

The relay 330 may be configured to authorize a device to request tokens from the authentication server 320 only if that device is authorized to access the service on the service server 310. In some embodiments, relay 330 is not required, and mobile devices 340 may authenticate directly with the authentication server 320.

In some embodiments, the service server 310 comprises a browsing proxy. The authentication server and the browsing proxy may be configured with a shared secret, such as, but not limited to a password.

In some embodiments, the authentication server and the service server are configured to obtain the shared secret during setup. In some embodiments, the shared secret is sent to each of the authentication server and the service server by a third entity. In other embodiments, the shared secret is communicated from the authentication server to the service server or vice-versa. It may not be necessary for the authentication server and service server to communicate with each other after the shared secret is exchanged.

Figure 3:
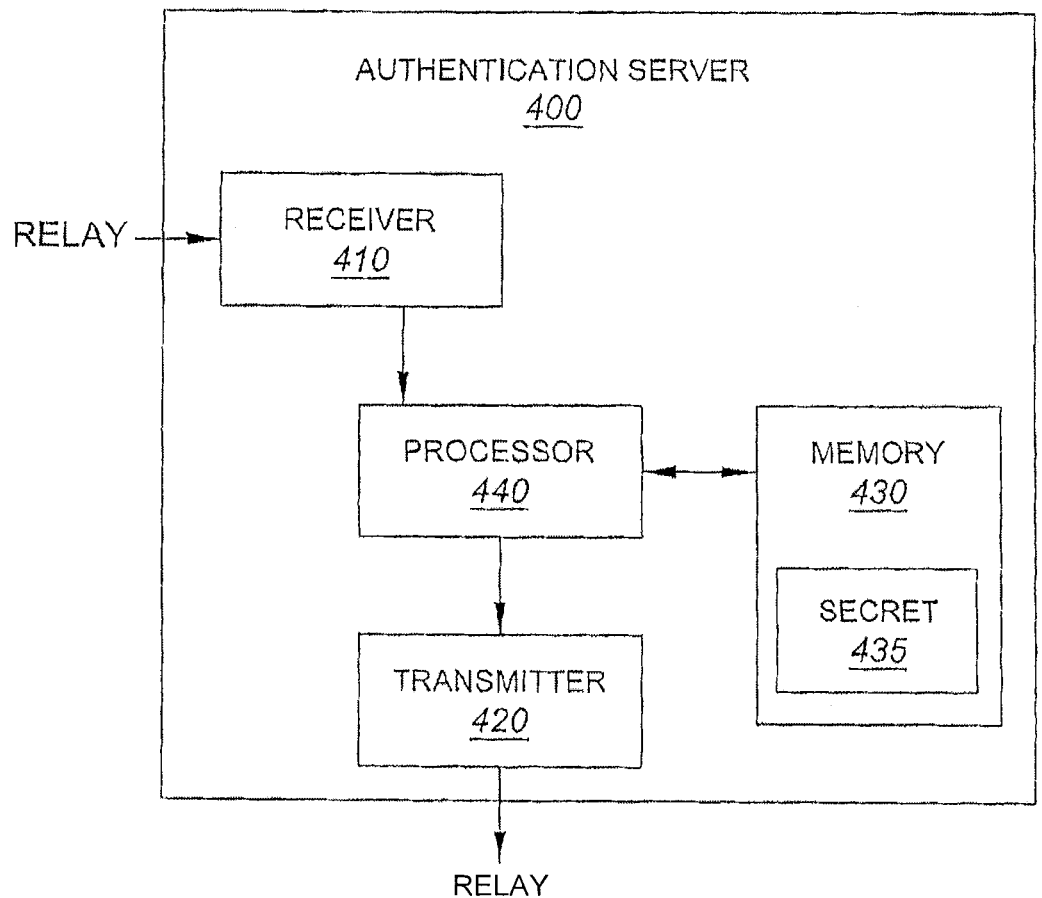
FIG. 3 is a block diagram of an authentication server in accordance with one example implementation.

An example embodiment of an authentication server will now be described with reference to FIG. 3. The authentication server 400 comprises a receiver 410, a transmitter 420, a memory 430 and a processor 440. The receiver 410 is configured to receive communications from a relay or a mobile device or both, depending upon the particular implementation. The transmitter 420 is configured to transmit communications to the relay or the mobile device or both, depending upon the particular implementation. The memory 430 may store a secret 435 shared with a service server from which a service is provided. The processor 440 is configured to generate a token (e.g. token 700 in FIG. 4) that includes an indication that the mobile device is authorized to access the service. This indication may be in the form of authentication data indicating a level of access that the mobile device is permitted to have to the service provided by the service server. In some embodiments, the processor 440 generates the token in response to a request from a mobile device received at the receiver 410. In alternative embodiments, the processor 440 generates the token in response to a request originating from a mobile device received via the relay at the receiver 410. The processor 440 is also configured to cause the transmitter 420 to transmit the token to the mobile device, either directly or through the relay.

In some embodiments of the authentication server 400, the processor 440 is configured to generate the token based on a reliance upon the relay to authenticate the mobile device.

In some embodiments, the authentication server 400 is connected to the relay by a direct connection, a token request is received over the direct connection, and the token is transmitted to the relay over the direct connection.

In some embodiments, the processor 440 is further configured to verify that a device identifier carried in the request matches a source address of a message containing the request. The mobile device includes its device identifier in the request for the token. The request for the token is sent as part of a message that includes information such as the source address of the message. The relay may verify that the source address is authentic. In this regard, the processor 440 at the authentication server may extract the device identifier from the source address in the message and compare it to the device identifier in the request.

In some embodiments, the processor 440 is further configured to obtain a device identifier for the mobile device from the request and include the device identifier in the token.

In some embodiments, the processor 440 is configured to include an expiry threshold in the token. Non-limiting examples of the expiry threshold include an identification of a time period after which the token expires, an identification of a particular date or time or both, or a number of times the mobile device can access the service server using the same token after which the token expires.

In some embodiments, the processor 440 is configured to generate the token authorizing the mobile device to access a browsing proxy. In some embodiments, the processor 440 is further configured to negotiate a session key with the mobile device through the relay, the session key being for encrypting and decrypting communications between the mobile device and the authentication server.

Figure 4:
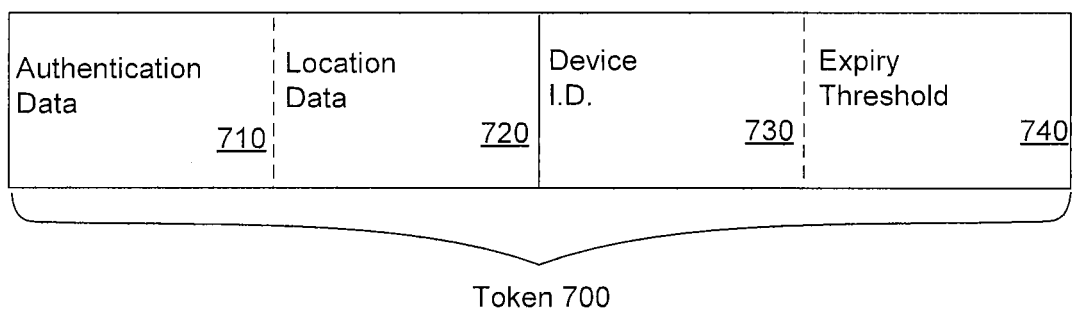
FIG. 4 is a block diagram of a token generated by an authentication server in accordance with one example implementation.

Referring to FIG. 4, in addition to the indication that the mobile device is authorized to access the service (e.g. authentication data 710), in accordance with at least one embodiment the token 700 generated by the authentication server includes location data 720 identifying a location for the mobile device. In some embodiments, the location data identifies a geographical location of the mobile device.

For example, the location data may indicate that the mobile device is registered in a certain city, state, province, country, or region (e.g. Asia-Pacific, North America). For example, the location data may correspond to a billing address associated with the device. In such instances, the location data in the token may be independent of the physical location of the mobile device at the time the token was requested.

Alternatively, the location data may identify the geographical location in which the mobile device is determined to be operating at the time the request for the token is transmitted from the mobile device to the authentication server. In some embodiments, the location of the mobile device may be determined by GPS or aGPS. Such a location may be a relatively fine-grained location (e.g. within a few meters, or a few city blocks) and may represent the vicinity of a home address, or the vicinity of a work address. Alternatively, such a location may be a relatively coarse-grained location (e.g. identifying a city/metro area, a country, or a group of countries). For example, the location data may identify geographical coordinates (e.g. 36°10'00"N 86°47'00"W, or 16S 519486 4002456), the city (Nashville), county (Davidson County), state (Tennessee), country (United States), and/or region (e.g. Southeastern United States, North America, Europe). Other schemes for identifying a specific geographical location may be employed in variant embodiments.

In some embodiments, the token 700 includes an indication that the service server is to control access by the mobile device to the service based on the location data of the token. For example, authentication data 710 in the token may indicate that the service server is to permit access to the service if the location of the mobile device at the time that the mobile device is requesting access to the service corresponds to the location data of the token, and deny access to the service if the location of the mobile device at the time access to the service is requested does not correspond to the location data of the token. For instance, if the mobile device is in Nashville when requesting access to the service, and the location data in the token used to authenticate the mobile device with the service server identifies the United States as a location for the mobile device, the service server may permit access to the service, whereas if the mobile device attempts to authenticate using the same token, but is in Tokyo at the time of requesting access to the service, the service server may deny access to the service.

The authentication data 710 may indicate a number of variations of levels of access to the service based on the location data in the token, and different logic rules may be applied. Non-limiting examples of levels of access include: access to all the features of a service; access to a subset of the features of a service, access to the service at a limited or increased bandwidth, access to the service at a reduced or increased pricing tier, etc., and any or all of these levels of access may be dependent on the location data in the token, the location of the mobile device when access to the service from the service server is requested, or both.

For example, in embodiments where the service server comprises a browsing proxy server, non-limiting examples of levels of access include: full internet access when in certain locations, partial internet access (e.g. access to certain websites only, or access to text and graphical data but not video or audio data) in other locations, and no internet access in other locations; web content filtering (e.g. selectively filtering web content based on mobile device location, user age, etc.).

As a further example, if the mobile device is in Nashville when requesting access to the service, and location data in the token used to authenticate the mobile device with the service server identifies the United States as a location for the mobile device, the service server may permit access to the service at one pricing tier, whereas if the mobile device attempts to authenticate using the same token, but is in Tokyo at the time of requesting access to the service, the service server may permit access to the service at a different pricing tier.

In some embodiments, the service server may be configured to authorize or deny access to certain media files, change video or sound quality of media files, or track (e.g. log) requests depending on the location of a device.

In some embodiments, the service server may be configured to use the location data in tokens provided by several devices to, for example, pre-fetch or suggest (or both pre-fetch and suggest) content that is deemed to be popular for a set of mobile devices in a certain area.

In some embodiments, a location-specific service may be applied based on the location data in the token, such as automatically fetching weather information from a weather site based on the identified location of the mobile device.

In some embodiments, the token 700 further comprises a device identifier 730 for the mobile device, so that data that identifies the mobile device is embedded in token 700. For example, the device identifier may comprise an Internet Protocol (IP) address. In some embodiments, device identifier 730 includes data that identifies one or more specific users of the mobile device.

In embodiments where the token contains a device identifier and the token is encrypted, the service server (e.g. browsing proxy) is able to determine the device's identity while preventing any third-party from obtaining this information.

In some embodiments, the token 700 may further comprise an expiry threshold 740 in the token. Non-limiting examples of the expiry threshold include a time period after which the token expires, or a number of times the mobile device can access the service server using the same token after which the token expires.

In some embodiments, the mobile device is configured to periodically attempt a refresh of each authentication token before the respective token expires. In an example embodiment, the heuristic is to refresh an authentication token halfway into its expiration period. For example, if the token is to expire 48 hours after the token has been acquired, the mobile device will try to refresh the token 24 hours after token acquisition. To avoid bursts of concurrent token refresh requests, in some embodiments, a refresh schedule includes a random factor. For example, the token will be updated every 20±8 hours and the expiration time can be computed as 20+16R−8 where R is a random number in the range of [0, 1].

In some embodiments, the mobile device is configured to refresh authentication tokens upon detection of a change of location of the mobile device (e.g. when roaming).

In some embodiments, a new token may also be requested in response to at least one of the following events: HTTP 407 is received from a browsing proxy (except initial request with the token not specified); a battery pull or hard reset; and a time change that affects the operation of the mobile device.

Referring again to FIG. 2, a location server 360 may provide data to the authentication server 320 or the relay 330 at the time a request for a token is made by the mobile device. The data provided by the location server 360 may indicate a location for the mobile device at the time the request for the token is made by the mobile device. Location server 360 may determine a location for the mobile device based on information received from either the mobile device 340 directly, the network 101 on which the mobile device is operating, or both. In some embodiments, the authentication server 320 determines a location for the mobile device based on data received from the mobile device as part of, or accompanying, a request for a token. For example, in embodiments where mobile device 340 has GPS capabilities (e.g. mobile device 340 has a GPS subsystem 260), the mobile device may determine its own location using GPS or assisted GPS (e.g. aGPS) and transmit this determined location to the authentication server 320, either directly, through relay 330, or through network 101. Alternatively, the authentication server 320 may receive data identifying a location for the mobile device from one or more of the location server 360, the relay 330, or the wireless network 101 on which the mobile device is operating.

In some embodiments, data indicating a location for the mobile device is pulled by (or pushed to) location server 360, authentication server 320, or both, on a periodic basis, so as to facilitate a form of caching (e.g. web proxy caching and/or edge caching, etc.) to reduce wireless network bandwidth.

In some embodiments, location server 360 may comprise a database, with entries for at least the device identifier and location information. In some embodiments, location server 360 may be a proxy to the mobile device (where the location server may poll the mobile device 340, wireless network 101, or relay 330). In some embodiments, location server 360 may comprise both a database and a proxy.

In some embodiments, location server 360 may apply rules or other logic for aggregating and/or translating data indicating a location for the mobile device to map, for example, IP address to country, or latitude/longitude to city/state.

Figure 5:
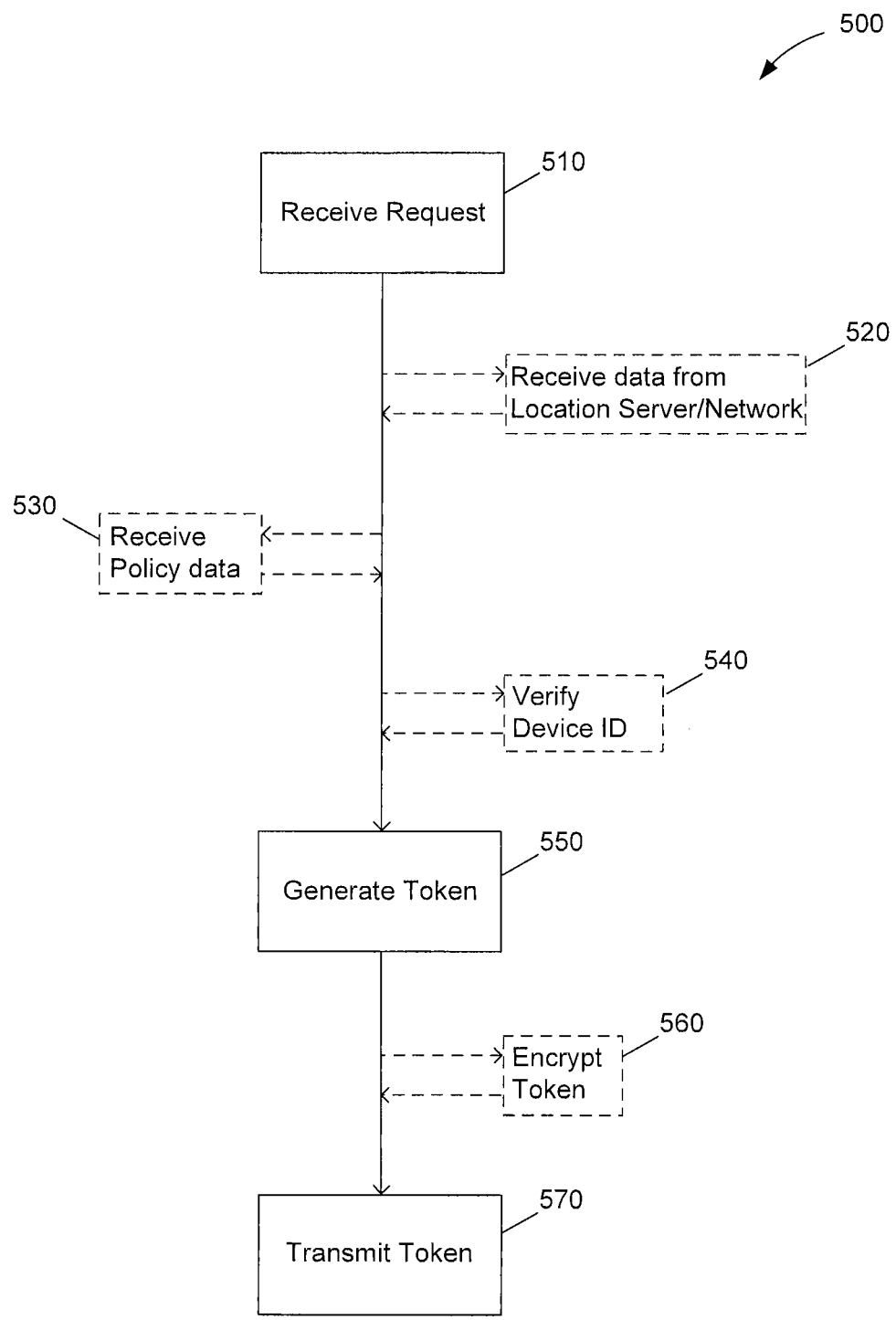
FIG. 5 is a flow chart of a method of generating a token in accordance with at least one example embodiment.

An example method of generating a token for use by a mobile device to establish authorization for the mobile device to access a service provided by a service server will now be described with reference to FIG. 5, and is shown generally as 500. Some of the details of method 500 have been previously described herein, and the reader is directed to earlier parts of the description for further details.

At 510, an authentication server (e.g. authentication server 320 of FIG. 2) receives a request for a token (e.g. token 700 of FIG. 4) from the mobile device (e.g. mobile device 201 of FIG. 1).

At 550, the authentication server generates the token, the token comprising location data identifying a location for the mobile device and authentication data indicating a level of access that the mobile device is permitted to have to the service provided by the service server (e.g. service server 310 of FIG. 2).

At 570, the authentication server transmits the token to the mobile device, which can be performed via a relay (e.g. relay 330 of FIG. 2).

In some embodiments, the request received from the mobile device comprises data on which the location data of the token is based.

In variant embodiments, as shown at 520, the authentication server receives data from at least one of a location services server (e.g. location server 360 of FIG. 2) and a network provider (e.g. network 101 of FIG. 2). The location data of the token generated at the authentication server may then be based on the data received at 520.

In some embodiments, as shown at 530, the authentication server receives policy data from a policy server (e.g. policy server 350 of FIG. 2). The policy data allows the authentication server to determine what services are accessible to the mobile device according to policies governing operation of the mobile device. The policy data may be configured by an administrator, for example. Authentication data of the token generated at the authentication server may then be generated based on the policy data received at 530.

In some embodiments, the request for a token comprises a device identifier and optionally, as shown at 540, the authentication server (or a relay) verifies that the device identifier corresponds to a source address of a message containing the request for the token prior to generating 550 the token. The verification is performed to prevent, for example, requests being made by devices other than the identified devices (e.g. spoofing attacks).

In some embodiments, as shown at 560, at least one of the location data and the authentication data of the token generated at the authentication server may be encrypted using a secret shared between the authentication server and the service server, prior to transmitting 570 the token to the mobile device.

In some embodiments, the generation of the token by the authentication server is responsive to the relay first successfully authenticating the mobile device.

To reduce bandwidth utilization and network latency introduced by the authentication procedure, in some embodiments, the authentication token is periodically refreshed automatically so that the mobile device is always likely to have a valid token (as having to obtain a new token at the time of requesting a service can cause a delay in providing the service—e.g. loading a web page if the service server comprises a browsing proxy server). In some embodiments, the refresh mechanism may be randomized so that every mobile device in the network will not be requesting a token refresh from the relay at the same time.

Figure 6:
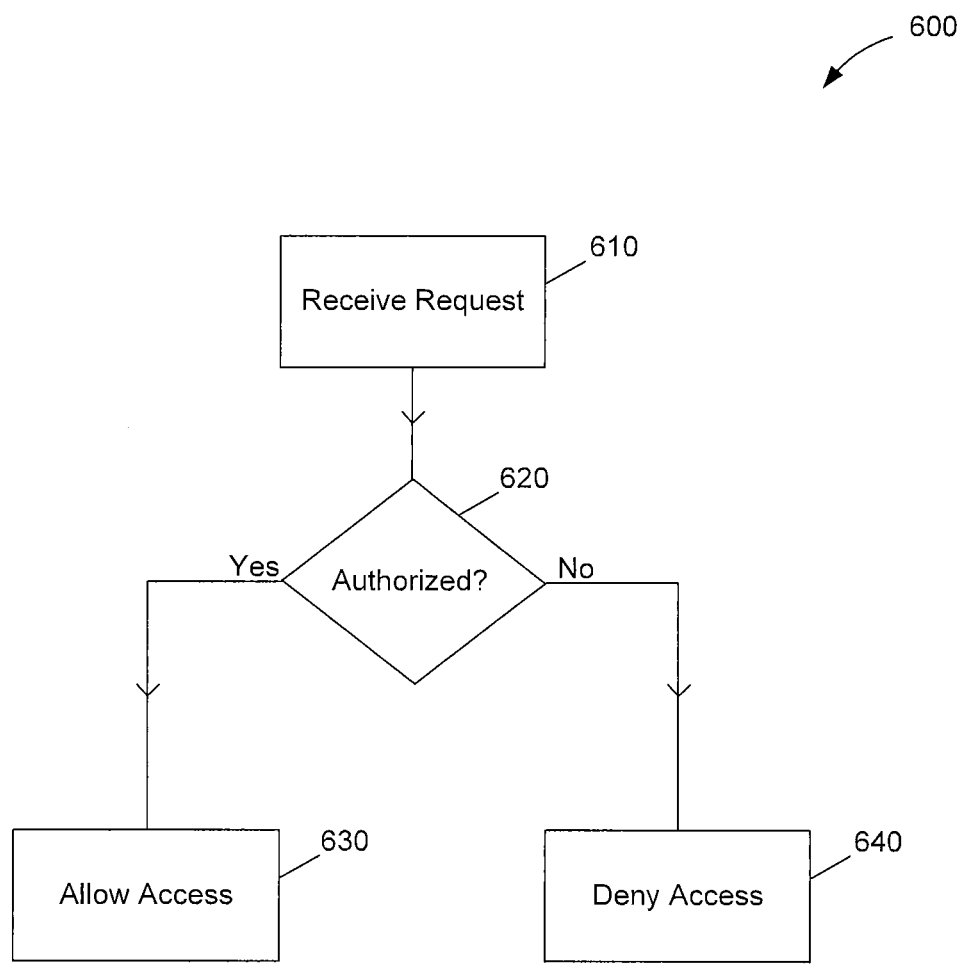
FIG. 6 is a flow chart of a method of authorizing a mobile device to access a service provided by a service server in accordance with at least one example embodiment.

An example method of authorizing a mobile device to access a service provided by a service server will now be described with reference to FIG. 6, and is shown generally as 600. Some of the details of method 600 have been previously described, and the reader is directed to earlier parts of the description for further details.

At 610, the service server (e.g. service server 310 of FIG. 2) receives a request from the mobile device (e.g. mobile device 201 of FIG. 1) to access the service, the request including or accompanied by a token (e.g. token 700 of FIG. 4) comprising location data identifying a location for the mobile device and authentication data indicating a level of access that the mobile device is permitted to have to the service provided by the service server.

At 620, the service server determines whether the mobile device is authorized to access the service based on both the authentication data and the location data in the token generated by the authentication server (e.g. authentication server 320 of FIG. 2). The service server may apply rules or other logic in making this determination. For example, the authentication data may indicate whether access should be a given to a particular service, and the level of access to be provided may be dependent on the location data in the token.

Where the service server determines that the mobile device is authorized to access the service, at 630 it allows the mobile device access to the service. The particular level of access that is granted to the mobile device may be controlled by the service server.

Where the service server determines that the mobile device is not authorized to access the service, at 640 it denies the mobile device access to the service.

In some embodiments, the authentication data of the token generated at the authentication server indicates that the service server is to control access by the mobile device to the service based on the location data of the token generated at the authentication server.

In some embodiments, the determination at 620 comprises the service server comparing the location data in the token generated by the authentication server to policy data [not shown] associated with the service; and if the policy data indicates that access to the service is authorized based on the location data, the mobile device is authorized to access to the service; or if the policy data indicates that access to the service is denied based on the location data, the mobile device is denied access to the service. In some embodiments, the policy data used for the determination 620 is received from a policy server (e.g. policy server 350 of FIG. 2), which may or may not be the same policy server from which the authentication server may receive policy data in certain embodiments.

In some embodiments, after receiving the token from the authentication server, the mobile device stores the authentication token in a memory, such as RAM (random access memory) or flash memory. In some embodiments, the token is stored unencrypted in a memory on the mobile device. Some embodiments of the mobile device comprise a device key store for storing the authentication keys. In some embodiments, every time a new attempt is made to access the service server providing the service, such as each time a TCP connection is opened by a browser (e.g. the browser module 282 on mobile device 201 described with reference to FIG. 1), the token may be stored in the device key store, in response to authentication by the mobile device of a key store password entered at the mobile device. In some embodiments, the authentication token is stored in a memory such that it survives memory cleaning. In some embodiments, a new token is requested on device start-up.

To ensure strong cryptography and to keep computational complexity at a reasonable level on the service server side, some embodiments of the authentication server will use Elliptic Curve Digital Signature Algorithm (ECDSA) long-term public key with P521Fp curve (a signing algorithm that can be used when addressing the authenticity of a message). ECDSA with P521Fp typically has 256 bit symmetric strength. In some embodiments, the authentication server will use Elliptic Curve Diffie-Hellman (ECDH) short-term public key with P521Fp curve (a key-exchange algorithm that can be used when securely exchanging a shared secret over an insecure channel). ECDH with P521Fp typically has 256 bit symmetric strength. It will be appreciated that other signature methods and/or key-exchange algorithms could be used with equivalent or alternative security strength, with or without Elliptic-Curve cryptography.

The systems, processes and methods of the described embodiments are capable of being implemented in a computer program product comprising a non-transitory computer readable medium that stores computer usable instructions for one or more processors that cause the one or more processors to operate in a specific and predefined manner to perform the functions described herein. The medium may be provided in various forms, including as volatile or non-volatile memory provided on optical, magnetic or electronic storage media.

While the above description describes features of example embodiments, it will be appreciated that some features and/or functions of the described embodiments are susceptible to modification without departing from the spirit and principles of operation of the described embodiments. Accordingly, what has been described above is intended to be illustrative of the claimed concept and non-limiting. It will be understood by persons skilled in the art that variations are possible in variant implementations and embodiments.

The invention claimed is:

1. A method of generating a token for use by a mobile device to establish authorization for the mobile device to access a service provided by a service server, the method comprising:
receiving, at an authentication server, a request for the token from the mobile device; and
responsive to receiving the request:
receiving, at the authentication server, policy data governing operation of the mobile device from a policy server;
receiving, at the authentication server, received location data from a network-side entity;
generating the token at the authentication server, the token comprising location data identifying a location for the mobile device and authentication data indicating a level of access that the mobile device is permitted to have to the service provided by the service server, the location data and the authentication data being provided in the same token, the location data of the token based on the received location data, the authentication data generated based on the policy data; and
transmitting the token to the mobile device.

2. The method of claim 1, wherein the network-side entity comprises a location services server or a network provider.

3. The method of claim 1, wherein the location data of the token identifies a geographical location of the mobile device.

4. The method of claim 1, wherein the location data of the token identifies a geographical location in which the mobile device is registered.

5. The method of claim 1, wherein the location data of the token identifies a geographical location in which the mobile device operates at a time the request is transmitted from the mobile device to the authentication server.

6. The method of claim 1, wherein the authentication data of the token generated at the authentication server indicates that the service server is to control access by the mobile device to the service based on the location data of the token generated at the authentication server.

7. The method of claim 1, wherein the authentication data of the token generated at the authentication server indicates that the service server is to control access by the mobile device to the service based on the location data of the token generated at the authentication server and on a location of the mobile device at a time that the mobile device requests access to the service from the service server.

8. The method of claim 1, further comprising encrypting at least one of the location data of the token or the authentication data of the token generated at the authentication server using a secret shared between the authentication server and the service server, prior to transmitting the token to the mobile device.

9. The method of claim 1, wherein the request for the token from the mobile device is received by the authentication server via a relay, and wherein the token is generated in response to the relay successfully authenticating the mobile device.

10. The method of claim 1, wherein the request comprises a device identifier, and wherein the method further comprises, prior to generating the token, verifying that the device identifier corresponds to a source address of a message containing the request for the token.

11. The method of claim 1, wherein the service server comprises a browsing proxy server.

12. An authentication server comprising:
a receiver configured to receive a request for a token from a mobile device, and configured, responsive to receiving the request, to receive from a policy server policy data governing operation of the mobile device and to receive received location data from a network-side entity, the token for use by the mobile device to establish authorization for the mobile device to access a service provided by a service server;
a transmitter configured to transmit the token to the mobile device;
a memory; and
a processor configured to generate the token, the token comprising location data identifying a location for the mobile device and authentication data indicating a level of access that the mobile device is permitted to have to the service provided by the service server, the location data and the authentication data being provided in the same token, the location data of the token based on the received location data, the authentication data generated based on the policy data, and the processor configured to cause the token to be transmitted to the mobile device,
wherein the policy data and the received location data are received responsive to receiving the request.

13. The authentication server of claim 12, wherein the network-side entity comprises a location services server or a network provider.

14. The authentication server of claim 12, wherein the location data of the token identifies a geographical location of the mobile device.

15. The authentication server of claim 12, wherein the location data of the token identifies a geographical location in which the mobile device is registered.

16. The authentication server of claim 12, wherein the location data of the token identifies a geographical location in which the mobile device operates at a time the request is transmitted from the mobile device to the authentication server.

17. The authentication server of claim 12, wherein the authentication data of the token generated at the authentication server indicates that the service server is to control access by the mobile device to the service based on the location data of the token generated at the authentication server.

18. The authentication server of claim 12, wherein the authentication data of the token generated at the authentication server indicates that the service server is to control access by the mobile device to the service based on the location data of the token generated at the authentication server and on a location of the mobile device at a time that the mobile device requests access to the service from the service server.

19. The authentication server of claim 12, wherein the processor is configured to encrypt at least one of the location data of the token or the authentication data of the token generated at the authentication server using a secret shared between the authentication server and the service server, prior to causing the token to be transmitted to the mobile device.

20. The authentication server of claim 12, wherein the receiver receives the request for the token via a relay, and wherein the processor is configured to generate the token in response to the relay successfully authenticating the mobile device.

21. The authentication server of claim 12, wherein the request comprises a device identifier, and the processor is configured to verify, prior to generating the token, that the device identifier corresponds to a source address of a message containing the request for the token.

22. The authentication server of claim 12, wherein the service server comprises a browsing proxy server.

23. A non-transitory computer-readable medium storing instructions which, when executed by a processor of an authentication server, result in:
receiving, at the authentication server, a request for a token from a mobile device, the token for use by the mobile device to establish authorization for the mobile device to access a service provided by a service server; and
responsive to receiving the request:
receiving, at the authentication server, policy data governing operation of the mobile device from a policy server;
receiving, at the authentication server, received location data from a network-side entity;
generating the token, the token comprising location data identifying a location for the mobile device and authentication data indicating a level of access that the mobile device is permitted to have to the service provided by the service server, the location data and the authentication data being provided in the same token, the location data of the token based on the received location data, the authentication data generated based on the policy data; and
transmitting the token to the mobile device.

24. The non-transitory computer-readable medium of claim 23, wherein the network-side entity comprises a location services sewer or a network provider.

25. The non-transitory computer-readable medium of claim 23, wherein the location data of the token identifies a geographical location of the mobile device.

26. The non-transitory computer-readable medium of claim 23, wherein the location data of the token identifies a geographical location in which the mobile device is registered.

27. The non-transitory computer-readable medium of claim 23, wherein the location data of the token identifies a geographical location in which the mobile device operates at a time the request is transmitted from the mobile device to the authentication server.

28. The non-transitory computer-readable medium of claim 23, wherein the authentication data of the token generated at the authentication sewer indicates that the service sewer is to control access by the mobile device to the service based on the location data of the token generated at the authentication server.

29. The non-transitory computer-readable medium of claim 23, wherein the authentication data of the token generated at the authentication sewer indicates that the service sever is to control access by the mobile device to the service based on the location data of the token generated at the authentication server and on a location of the mobile device at a time that the mobile device requests access to the service from the service server.

30. The non-transitory computer-readable medium of claim 23, wherein the instructions, when executed by the processor, further result in encrypting at least one of the location data of the token or the authentication data of the token generated at the authentication server using a secret shared between the authentication server and the service server, prior to transmitting the token to the mobile device.

31. The non-transitory computer-readable medium of claim 23, wherein the request for the token from the mobile device is received by the authentication server via a relay, and wherein the token is generated in response to the relay successfully authenticating the mobile device.

32. The non-transitory computer-readable medium of claim 23, wherein the request comprises a device identifier, and wherein the instructions, when executed by the processor, further result in verifying that the device identifier corresponds to a source address of a message containing the request for the token, prior to generating the token.

33. The non-transitory computer-readable medium of claim 23, wherein the service server comprises a browsing proxy server.

* * * * *

UNITED STATES PATENT AND TRADEMARK OFFICE
CERTIFICATE OF CORRECTION

PATENT NO. : 9,060,273 B2
APPLICATION NO. : 13/427333
DATED : June 16, 2015
INVENTOR(S) : Andrew James Guy Brown et al.

It is certified that error appears in the above-identified patent and that said Letters Patent is hereby corrected as shown below:

In the claims

Column 20, lines 6-9, Claim 28, should recite "claim 23, wherein the authentication data of the token generated at the authentication server indicates that the service server is to control access by the mobile device to the service"

Column 20, lines 12-14, Claim 29, should recite "claim 23, wherein the authentication data of the token generated at the authentication server indicates that the service server is to control access by the mobile device to the service"

Signed and Sealed this
Tenth Day of May, 2016

Michelle K. Lee
*Director of the United States Patent and Trademark Office*